United States Patent [19]

Linenberg

[11] 3,733,908

[45] May 22, 1973

[54] SAMPLING VALVE AND COMPOUND DETECTION SYSTEM

[75] Inventor: Amos Linenberg, Rehovot, Israel

[73] Assignee: Hydronautics-Israel Ltd., Rehovot, Israel

[22] Filed: Apr. 28, 1971

[21] Appl. No.: 138,267

Related U.S. Application Data

[63] Continuation-in-part of Ser. No. 62,215, Aug. 19, 1970, Pat. No. 3,675,466.

[52] U.S. Cl. .............................................73/422 GC
[51] Int. Cl. ...............................................G01n 1/22
[58] Field of Search ................................73/422 GC; 137/625.19

[56] References Cited

UNITED STATES PATENTS

| 241,002 | 5/1881 | Hamilton | 137/625.19 |
| 3,282,651 | 11/1966 | Ferrari | 137/625.19 |
| 3,355,250 | 11/1967 | Gorring | 73/422 X |

Primary Examiner—S. Clement Swisher
Attorney—Finnegan, Henderson & Farabow

[57] ABSTRACT

A sampling valve is provided for use with a chromatographic column or any other appropriate detection device for use in the detection of compounds in an ambient medium, such as air. The valve includes a housing having a plurality of apertures therein for respective communication with at least a carrier medium, the ambient medium and the detection device. A movable valve body is mounted within the housing and is provided with a plurality of apertures for selective communication with predetermined ones of the housing apertures. A platinum wire or other absorbing means is retained within a predetermined one of the valve body apertures and is selectively exposed to the ambient medium. The valve body is then moved and the platinum wire is heated to desorb the compounds in the presence of the carrier medium, such as helium, and the carrier medium, together with the compounds, are passed through the detection device to enable detection of the presence of the compounds.

9 Claims, 7 Drawing Figures

PATENTED MAY 22 1973 3,733,908

INVENTOR
AMOS LINENBERG

BY Finnegan, Henderson & Farabow
ATTORNEYS

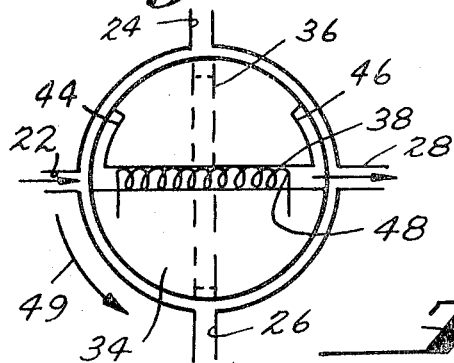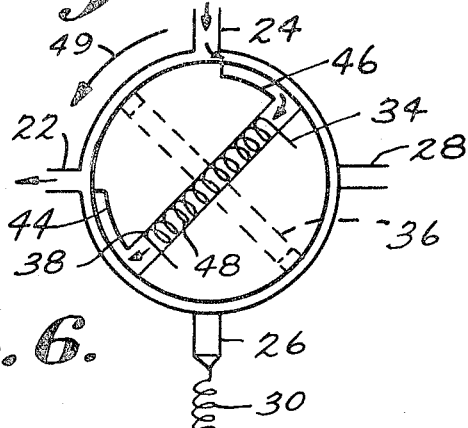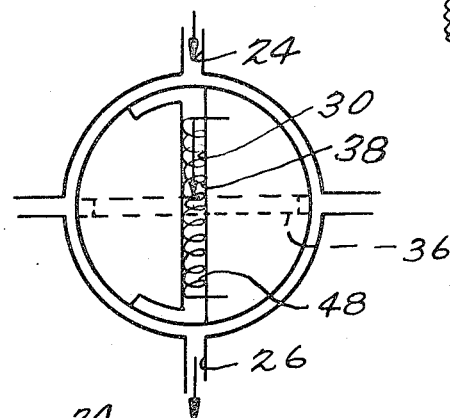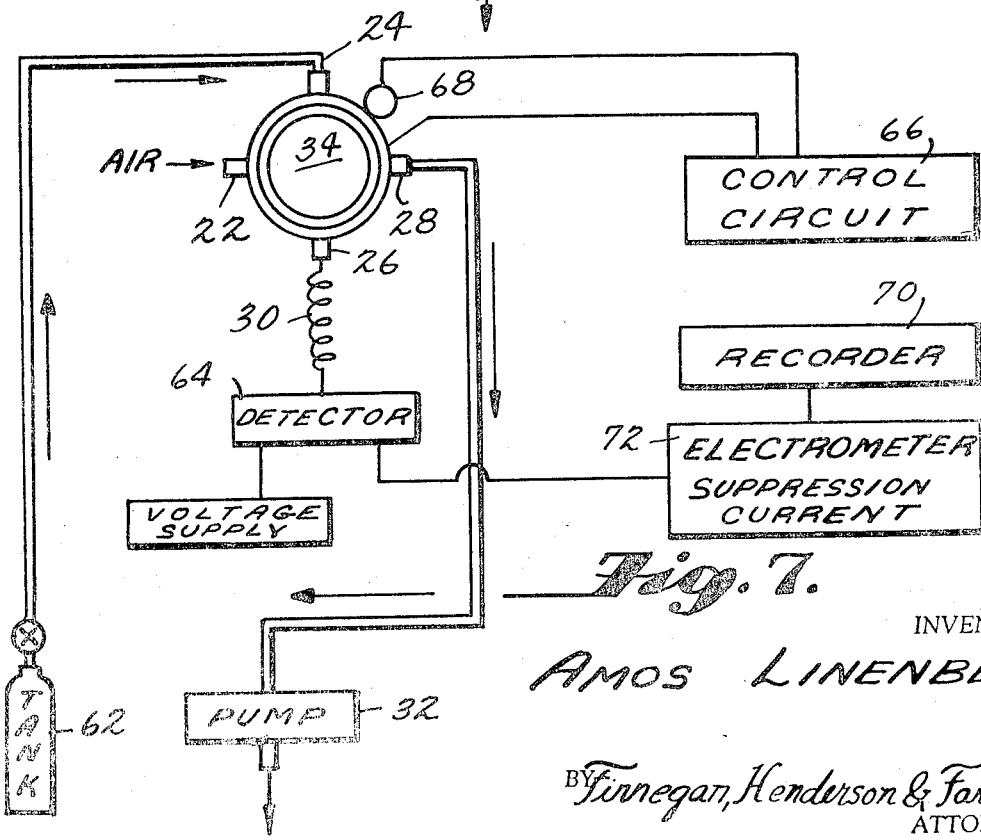

SAMPLING VALVE AND COMPOUND DETECTION SYSTEM

This application is a continuation-in-part of application Ser. No. 65,215, filed Aug. 19, 1970, now U.S. Pat. No. 3,675,466 for Sampling Valve and System for the Detection of Predetermined Compounds in Air.

The present invention relates to a sampling valve and detector system, and more particularly, to a sampling valve for use with a chromatographic column or any other appropriate detection device for enabling the detection of at least one predetermined compound in an ambient medium, such as air.

Detection of specific organic or other compounds in air is required for various scientific applications. With the recent increased interest in the problems of pollution of the atmosphere, the requirement for a suitable gas detection device has become extremely important. The need for a highly sensitive, continuously operating, portable, automatic, highly selective and versatile compound detector is not only present in the field of pollutant detection but is also a need which has existed for considerable time in other areas, such as mine safety, where the detection of explosive gases in the air is highly important for the safety of lives and property.

Numerous attempts have been made to develop a suitable detection device to detect specific compounds in air. Plasma chromatographic detectors, mass spectrometers, U. V. and I. R. spectrophotometers, fuel cells, gas chromatographs and various ionization detectors are among the instruments that have been developed in attempting to provide a highly sensitive, continuously operating, portable, automatic, highly selective, and versatile detection device.

Although most of these instruments are used successfully in particular fields, none of them satisfies all of the aforementioned requirements which should be present in an instrument adapted to accurately and conveniently detect specific compounds in air. Gas chromatography seems to be the method with the widest range of applications; however, two major problems are encountered when the gas chromatograph is adapted to selective and sensitive detection of organic compounds in air. These problems are sampling and selectivity. High selectivity may be obtained by choosing a suitable column and a selective detector, but sampling still remains a problem.

Injection of air samples into a gas chromatographic column or any other appropriate detection device is usually made with a syringe or by use of a gas sampling valve. Although these methods and the particular valves heretofore used have been found to be useful, they have several important disadvantages. For example, air may interfere when injected with the organic vapors to be analyzed, and this interference is due to the high concentrations of nitrogen and oxygen in air as compared to the low concentrations of organic vapors that may be present.

A sudden injection of 5 or 10 cc of air may cause serious interference in the flow rate of the carrier gas through the chromatographic column, the stability of which is very important. Furthermore, the maximum amount of 10 cc of air that may be injected into the gas chromatograph is insufficient for sensitive determinations of the presence of organic compounds. Air samples of sizes of several liters must be injected to allow the detection of quantities of one ppb and below.

It is, therefore, an object of the present invention to provide a unique sampling valve for use with a chromatographic column or any other appropriate detection device for enabling the detection of at least one predetermined compound in an ambient medium, such as air.

Another object is to provide a simply constructed, sturdy, and inexpensive sampling valve for use with a chromatographic column system for enabling the detection of organic compounds in air.

A further object of the invention is to provide a highly sensitive, selective and versatile apparatus for detecting the presence of organic compounds in a large sample of air.

Additional objects and advantages of the invention will be set forth in part in the description which follows, and in part will be obvious from the description, or may be learned by practice of the invention. The objects and advantages are realized and obtained by means of the instrumentalities and combinations particularly pointed out in the appended claims.

To achieve these objects, this invention provides apparatus that embraces all the advantages of similarly employed detection devices and which possesses none of the aforedescribed disadvantages. As embodied and broadly described, the invention utilizes a single, unique sampling valve, that together with a chromatographic system, provides a highly sensitive detection system which has a minimal response time and which is highly selective and versatile so that it can be readily used for the detection of a number of compounds. The device of this invention is also compact and portable and may be operated automatically.

The sampling valve includes a housing having a plurality of apertures therein for communicating respectively with at least a supply of a carrier medium, an ambient medium and a detection device, such as a chromatographic column. A valve body is movably mounted within the housing and has a plurality of apertures therein for selective communication with predetermined ones of the housing apertures. The valve body also includes first and second channels in fluid communication with and adjacent to the ends of a first valve body aperture to enable this aperture to be selectively positioned in fluid communication with the housing apertures. The valve body further has first and second passages in fluid communication with and positioned adjacent to the ends of a second valve body aperture.

In addition, the valve comprises means for absorbing at least one compound from the ambient medium, and this adsorbing means, preferably platinum wire, is retained within the second valve body aperture. Means are also provided in operative relationship for enabling selective movement of the valve body, and means are provided in operative relationship for selectively heating the adsorber means to desorb the compound from the adsorbing means when the second valve body aperture is in fluid communication with the detection device.

It should be understood that both the foregoing general description and the following detailed description are exemplary and explanatory and are not restrictive of the invention.

The accompanying drawings illustrate an example of a preferred embodiment of the invention and together with the description, serve to explain the principles of the invention.

In the drawings:

FIG. 4 is a diagrammatic view similar to FIG. 3 of the sampling valve of this invention with the valve body positioned in a first position as illustrated in FIG. 1;

FIG. 5 is a diagrammatic view of the sampling valve of this invention but with the valve body rotated 45° from the position shown in FIG. 4;

FIG. 6 is a diagrammatic view of the valve but with the valve body rotated 90° from the position shown in FIG. 4; and FIG. 7 is a diagrammatic view of one embodiment of the valve and the detector system in accordance with this invention.

Figure 1:
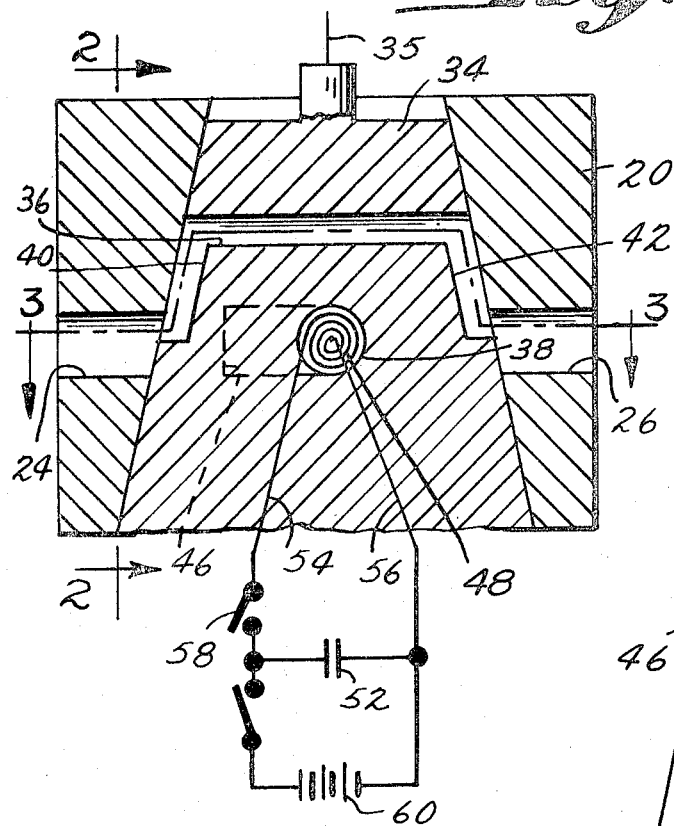
FIG. 1 is a sectional view of the valve body and the valve housing with the valve body in a first position.
Figure 2:
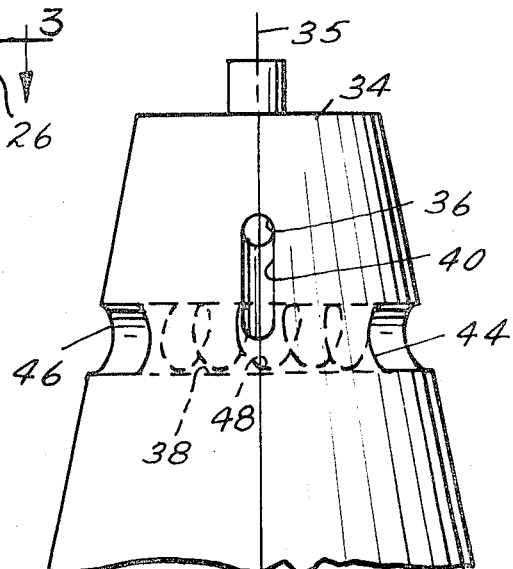
FIG. 2 is an elevation view of the valve body with the valve housing removed and looking along line 2—2 in FIG. 1.

Basically, the detector system of this invention utilizes a valve body that is preferably made of polytetrafluroethylene and which is free to rotate in a housing preferably made of stainless steel. Other suitable materials can be used for the valve body and for the housing. The housing is connected to a gas chromatographic column and is designed in such a way that at one position ambient atmospheric air flows through the valve while at a second position the valve is open to the chromatographic column.

A coil of platinum wire, which may be coated with the appropriate liquid phase, is used for the adsorption of the compounds to be detected. When air is passed through the valve and over the platinum wire, organic compounds, for example, will be adsorbed by the wire while other gases will pass through the wire without being adsorbed thereby. Selective adsorption is achieved through the use of the proper phase as is well known in the art. After adsorption is complete the platinum wire is heated and all the compounds previously adsorbed by the wire are immediately desorbed and are carried into the chromatographic column by an inert carrier gas, such as helium, for analysis and indication of the presence or absence of the compounds.

With reference now to the drawings, wherein like reference characters designate like or corresponding parts throughout the several views, there is shown in FIGS. 1-6 a housing 20 having a plurality of apertures 22, 24, 26, and 28 therein. Housing aperture 26 is positioned in communicating relationship with a chromatographic column 30. Aperture 22 is in communicating relationship with an ambient medium, such as the atmosphere, and aperture 28 is in communication with a pump 32 (FIG. 7) or other means for causing air to be drawn into housing aperture 22 and through the sampling valve in a manner to be described. Housing aperture 24 is in communicating relationship with a supply of carrier gas, such as helium. A valve body 34, preferably shaped as a truncated cone for improved sealing with housing 20, is movably mounted within housing 20 to be rotated about a centrally located axis 35. The valve body has a plurality of apertures 36 and 38 therein for selective communication with predetermined ones of the housing apertures.

In addition, valve body 34 has first and second channels 40 and 42 in fluid communication with and positioned adjacent to the ends of first valve body aperture 36. Channels 40 and 42 enable valve body aperture 36 to be selectively positioned in fluid communication with housing apertures 22 and 28, and alternatively, with housing apertures 24 and 26. Valve body 34 also has first and second passages 44 and 46 located adjacent to and in fluid communication with the ends of valve body aperture 38. The function of these passages will be described infra.

In accordance with the invention, means for adsorbing at least one compound from the ambient medium are provided and are retained within second valve body aperture 38. As here embodied, the adsorbing means include a platinum wire 48 that is fixedly held within aperture 38. In accordance with the invention, means are also provided in operative relationship for selectively heating the adsorber means or platinum wire 48. As here embodied, the heating means include a storage capacitor 52. Any other suitable electrical storage means could also be used. Storage capacitor 52 is electrically coupled to platinum wire 48 via leads 54 and 56, and a switch 58 is located in circuit with capacitor 52 together with an electrical energy source 60 whereby capacitor 52 is selectively charged by energy source 60 and discharged by closing of switch 58.

Figure 3:
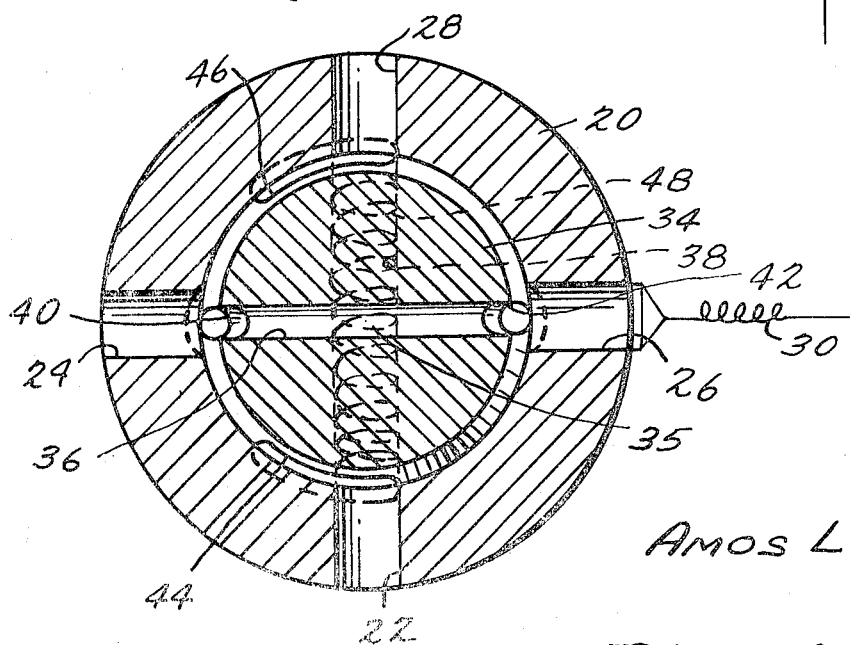
FIG. 3 is a broken top sectional view of the sampling valve of this invention taken along the lines 3—3 of FIG. 1.

In operation of the sampling valve of this invention, valve body 34 is initially located in a first position, as illustrated in FIGS. 1, 3, and 4. In this position, valve body aperture 38 is in communication with housing apertures 22 and 28 and with the atmosphere or ambient medium. At the same time, valve body aperture 36 and channels 40 and 42 are in communication with housing apertures 24 and 26.

In this first position, the carrier gas, such as helium, passes in through housing aperture 24, channel 40, valve body aperture 36, channel 42, out through housing aperture 26 and into and through chromatographic column 30. Simultaneously, air from the ambient medium is drawn in through first housing aperture 22, valve body aperture 38, and out through housing aperture 28 by means of a pump 32 (FIG. 7). As a result, air passes over platinum wire 48 in aperture 38 whereby certain compounds that are present in the atmosphere are adsorbed by the platinum wire.

Accurate temperature control and a steady carrier gas flow rate through chromatographic column 30 are required to obtain accurate and reproducible results in the detection of predetermined compounds. Accordingly, an important feature of this sampling valve is that it provides a substantially continuous and steady carrier gas flow rate through the chromatographic column via valve body aperture 36 when platinum wire 48 is being subjected to the atmosphere.

After wire 48 has been exposed to the air for the desired length of time, valve body 34 is rotated counter clockwise in the direction of arrow 49 as illustrated in FIGS. 4 and 5 to the position shown in FIG. 6. Before reaching that position, however, valve body 34 passes through an intermediate position (FIG. 5) whereby valve body aperture 38 and platinum wire 48 are in brief communication with housing apertures 22 and 24 so that the carrier gas passes through housing aperture 24, passage 46, valve body aperture 38 and over wire 48, passage 44, and out through housing aperture 22.

In this intermediate position, valve body aperture 38 is flushed of any residual air from the atmosphere by means of the carrier gas, and valve body aperture 36 is sealed by housing 20. By flushing aperture 38, the accuracy of the results is markedly enhanced since all air is expelled from the system prior to the desorbing step. In this way, extraneous readings are avoided, and only the presence of the predetermined compound, or compounds, as they are desorbed from the platinum wire 48, is detected when they pass through chromatographic column 30 in a later step. The wire 48 is not heated at this time so that the carrier gas does not flush out any of the compounds adsorbed by the wire.

Valve body 34 is then rotated to the position shown in FIG. 6, where valve body aperture 38 is placed in communicating relationship with the carrier gas via housing aperture 24 and with chromatographic column 30 via housing aperture 26.

The flow of carrier gas from tank 62 (FIG. 7) through housing aperture 24 and into column 30 is interrupted only for the very short time that it takes for valve body 34 to rotate approximately 90° from its first position (FIGS. 1, 3, and 4) to its second position (FIG. 6). Thus, substantially constant gas flow through the chromatograph column 30 is maintained.

In the second position (FIG. 6) carrier gas flows through housing aperture 24, valve body aperture 38; over platinum wire 48, out through housing aperture 26, and into and through chromatographic column 30. As soon as valve body 34 reaches the second position (FIG. 6), switch 58 (FIG. 1) is closed so that capacitor 52 is discharged and the current passing through platinum wire 48 heats the wire so as to desorb any compounds which have previously been adsorbed thereby. The carrier gas together with the desorbed compounds then pass through the chromatographic column 30, and the presence of the compounds is determined by the conventional detector 64 (FIG. 7).

One preferred system for use with the sampling valve of this invention is illustrated in FIG. 7. In operation of the system shown in FIG. 7, valve body 34 is initially positioned by a conventional control circuit 66 and by a motor 68 with valve body aperture 38 aligned with housing apertures 22 and 28. This permits the ambient medium, or air, to be drawn into housing aperture 22, through valve body aperture 38, over platinum wire 48, and out through housing aperture 28 by pump 32. Compounds to be detected are, thus, adsorbed by platinum wire 48. At the same time, valve body aperture 36 is aligned with housing apertures 24 and 26, and the carrier gas (helium) flows into and through chromatographic column 30.

After the air is passed over the platinum wire and the compounds have been adsorbed thereby, motor 68 is activated by control circuit 66 so that valve body 34 rotates in a counter clockwise direction, as illustrated in FIGS. 4 and 5. As the valve body moves from the position shown in FIGS. 1, 3, and 4 to the position shown in FIG. 6, it passes, without stopping, through an intermediate position illustrated in FIG. 5. This permits valve body aperture 38 to be purged of air, the carrier gas now passing from tank 62 through housing aperture 24, passage 46, valve body aperture 38, passage 44, and out through housing aperture 22 into the ambient air. The valve body continues to rotate until it is stopped in the position illustrated in FIG. 6 by a controlling microswitch (not shown) or other conventional means.

Switch 58 is then closed, manually or by control circuit 66 as desired, and capacitor 52 is discharged through platinum wire 48. The passage of current through the wire heats the wire and causes the compounds previously adsorbed thereby to be desorbed. These compounds are then carried by the carrier gas through housing aperture 26, through chromatographic column 30 to a conventional ionization or other type of detector 64. This detector responds to organic compounds by generating a current which is displayed on recorder 70 after being amplified by electrometer 72. Thus, if a compound is present the recorder will indicate its presence to the operator.

Because the time required for each compound to reach the end of the column 30 is specific and depends on the temperature and gas flow conditions, this time may be used for identification. An alarm system (not shown) may be connected to the recorder to be activated when a peak signal arrives in order to indicate when a specific compound is present in the atmosphere.

The present invention, thus, provides for a unique sampling valve and for an apparatus for detecting the presence of compounds in the atmosphere. Of course, the valve can be used to detect compounds in so-called ambient mediums other than air. The device is highly sensitive, has a short time response, is portable, automatic, highly selective, and versatile. A gas chromatograph or other suitable detection device can be utilized with the device of this invention to enable the detection of extremely low concentrations of organic vapors in the atmosphere.

The invention in its broader aspects is not limited to the specific details shown and described and departures may be made from such details without departing from the principles of the invention and without sacrificing its chief advantages.

What is claimed is:

1. A sampling valve for use with a detection device, for concentrating at least one compound from an ambient medium and for enabling the compound to be injected into the detection device, comprising:

a housing having a plurality of apertures communicating respectively with at least a supply of a carrier medium, said ambient medium and the detection device;

a valve body movably mounted within the housing and having a plurality of apertures therein for selective communication with predetermined ones of said housing apertures;

said valve body further having first and second channels in fluid communication with and positioned adjacent to the ends of a first one of said valve body apertures to enable said first valve body aperture to be selectively positioned in fluid communication with said housing apertures;

said valve body having first and second passages in fluid communication with and positioned adjacent to the ends of a second one of said valve body apertures;

means for adsorbing said compound from the ambient medium retained within said second valve body aperture;

means in operative relationship for enabling selective movement of the valve body; and means in operative relationship for selectively heating said adsorber means to desorb the compound from the adsorbing means when the second one of said valve body apertures is in fluid communication with the detection device.

2. A sampling valve as in claim 1 wherein the housing includes at least a first aperture in fluid communication with the ambient medium, a second aperture in fluid communication with the carrier medium and a third aperture in fluid communication with the detection device.

3. A sampling valve as in claim 2 wherein said movement means include means for enabling sequential movement of the valve body between a first position where the second valve body aperture is in fluid communication with the first housing aperture and to a second position where the second valve body aperture is in fluid communication with the second and third housing apertures.

4. A sampling valve as in claim 3 wherein the first valve body aperture is in fluid communication with the second and third housing apertures when the valve body is in said first position to enable a substantially constant flow of the carrier medium into the detection device.

5. A sampling valve as in claim 4 wherein said passages are positioned to enable brief purging communication between the first and second housing apertures via the second valve body aperture and the passages as the valve body is moved between the first position and the second position.

6. A sampling valve as in claim 5 further including a fourth housing aperture positioned for fluid communication with the first housing aperture and with the second valve body aperture when the valve body is in the first position.

7. A sampling valve as in claim 6 wherein the valve body is in the form of a truncated cone for enhanced sealing with the housing.

8. A sampling valve as in claim 6 wherein said heating means include:
a storage capacitor;
leads in circuit with said adsorbing means and said capacitor; and
a switch in circuit with said leads and said capacitor for enabling selective discharge of the capacitor through said adsorber means.

9. A sampling valve as in claim 5 wherein said adsorbing means includes a coil of platinum wire.

* * * * *